(12) United States Patent
Turner et al.

(10) Patent No.: US 10,651,895 B2
(45) Date of Patent: May 12, 2020

(54) PROVISIONING DEVICES USING NEAR-FIELD COMMUNICATION

(71) Applicant: AirWatch LLC, Atlanta, GA (US)

(72) Inventors: Stephen Turner, Atlanta, GA (US); Scott Kelley, Atlanta, GA (US)

(73) Assignee: Airwatch LLC, Atlanta, GA (US)

( * ) Notice: Subject to any disclaimer, the term of this patent is extended or adjusted under 35 U.S.C. 154(b) by 1 day.

(21) Appl. No.: 15/899,964

(22) Filed: Feb. 20, 2018

(65) Prior Publication Data

US 2018/0175913 A1 Jun. 21, 2018

Related U.S. Application Data

(63) Continuation of application No. 15/141,925, filed on Apr. 29, 2016, now Pat. No. 9,917,619.

(51) Int. Cl.
| | |
|---|---|
| *H04B 5/00* | (2006.01) |
| *H04W 12/06* | (2009.01) |
| *H04W 48/16* | (2009.01) |
| *H04W 12/08* | (2009.01) |
| *H04W 76/11* | (2018.01) |
| *H04W 4/80* | (2018.01) |
| *H04W 8/20* | (2009.01) |
| *H04W 84/12* | (2009.01) |

(52) U.S. Cl.
CPC ............ *H04B 5/0031* (2013.01); *H04W 4/80* (2018.02); *H04W 8/20* (2013.01); *H04W 12/06* (2013.01); *H04W 12/08* (2013.01); *H04W 48/16* (2013.01); *H04W 76/11* (2018.02); *H04W 84/12* (2013.01)

(58) Field of Classification Search
CPC .... H04B 5/0031; H04W 4/008; H04W 12/06; H04W 12/08; H04W 48/16; H04W 76/021; H04W 84/12
USPC .................................................. 455/41.1–41.3
See application file for complete search history.

(56) References Cited

U.S. PATENT DOCUMENTS

| | | | |
|---|---|---|---|
| 2015/0081837 A1* | 3/2015 | Bernier ................... | H04W 8/24 709/217 |
| 2016/0020803 A1* | 1/2016 | Cha ....................... | H04B 1/3816 455/558 |
| 2016/0270020 A1* | 9/2016 | Adrangi .................. | H04L 67/02 |

OTHER PUBLICATIONS

Just bump to enroll devices with Android Near Field Communication (NFC), ManageEngine Blog, https://blogs.manageengine.com/desktop-mobile/mobile-device-manager-plus/2015/11/20/just-bump-to-enroll-devices-with-android-near-field-communication-nfc.htnnl, Nov. 20, 2015, pp. 1-3.*
Enroll Android devices Using NFC, ManageEngine, Mobile Device Manage Plus, https://www.manageengine.com/mobile-device-management/help/enrollment/enroll_android_devices_using_admin_enrollment_tool.html, Aug. 22, 2015, pp. 1-6.*

* cited by examiner

*Primary Examiner* — Edward F Urban
*Assistant Examiner* — Angelica M Perez
(74) *Attorney, Agent, or Firm* — Thomas | Horstemeyer, LLP (57) ABSTRACT

Disclosed are various examples for provisioning a client device through near-field communication (NFC). An administrator device can provide configuration parameters to a client device in a factory-reset condition through an NFC bump. A second NFC bump can be performed that provides enrollment parameters to the client device, after which the client device can complete enrollment with an enterprise mobility management (EMM) service.

20 Claims, 7 Drawing Sheets

PROVISIONING DEVICES USING NEAR-FIELD COMMUNICATION

CROSS-REFERENCE TO RELATED APPLICATIONS

This application is a continuation of and claims priority to application Ser. No. 15/141,925, filed on Apr. 29, 2016 and titled "PROVISIONING DEVICES USING NEAR-FIELD COMMUNICATION," which is incorporated by reference herein in its entirety.

BACKGROUND

Some enterprises provide users with computing devices such as smartphones. These enterprises can impose restrictions on the usage of devices issued to users by way of a device management framework that is provided by the operating system of the device. For example, devices that are running a variant of the Android™ operating system can be enrolled with a management service using application programming interfaces (APIs) or other capabilities that are embedded within the operating system of the device. A management component can also be installed on a client device so the device can be locally managed by the management component and remotely managed by the management service. For example, an administrator can define policies or profiles that are associated with a particular client device through the management service, which can transmit the policies or profiles to the client device. The management component on the client device can install or enforce the policies or profiles on the client device. Additionally, the management service can issue commands to the management component to take certain actions on the client device.

In some scenarios, an information technology (IT) administrator or user might have to provision a large number of client devices that are deployed to users of an enterprise. Provisioning client devices can require the installation of the management component and configuration of various enrollment parameters on the client device to ensure that the client device is enrolled with the management service and that the operating system of the client device is configured such that the management component is granted administrative or owner privileges over the client device. This can be a time consuming and manual process for an IT administrator to perform on a potentially large number of client devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a system that facilitates provisioning of a client device, such as a smartphone or tablet, using near-field communication (NFC). An administrator device can execute a provisioning application that can access confirmation parameters with which the client device can be provisioned. The administrator device can then initiate one or more NFC sessions in which the configuration parameters can be transmitted to the client device. The client device can be provisioned with the configuration parameters, which entails installation of a management component and enrollment of the client device with a management service, among other provisioning tasks.

In an enterprise setting, an information technology (IT) administrator might be tasked with provisioning client devices by installing a management component and enrolling the device with the management service. Provisioning the client devices can be a manual and labor intensive task that involves an IT administrator entering configuration parameters onto the client device one-by-one. This can be particularly time-consuming with respect to enrollment of the client device with the management service.

Enrollment of the client device with the management service can involve entering various parameters, such as a username, password, a network address for a remotely accessible management service, organization parameters, or other parameters that are specific to a particular enterprise's deployment of devices or deployment of a directory service like Microsoft Active Directory®. Requiring a user to manually configure the enrollment of a client device in this way might be infeasible if the IT administrator is tasked with provisioning tens or hundreds of devices.

Figure 1A:
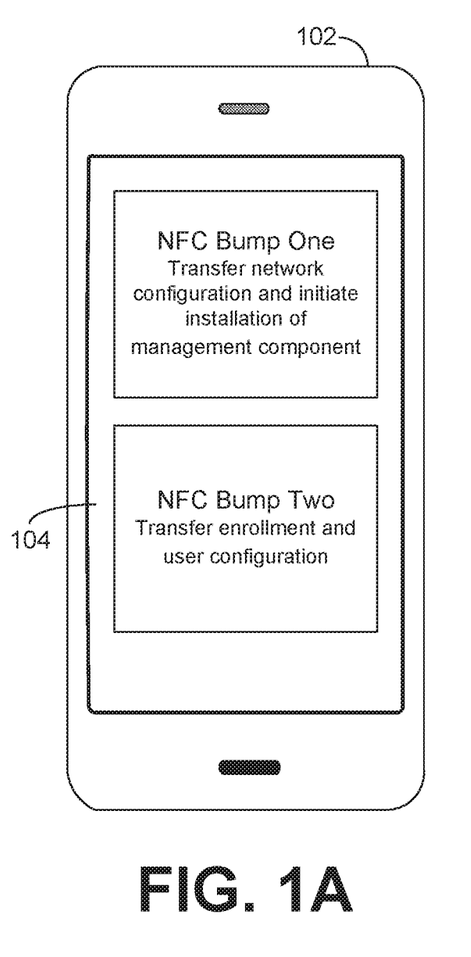
FIG. 1A is a drawing of an administrator device that can facilitate provisioning of client devices according to examples of the disclosure.
Figure 1B:
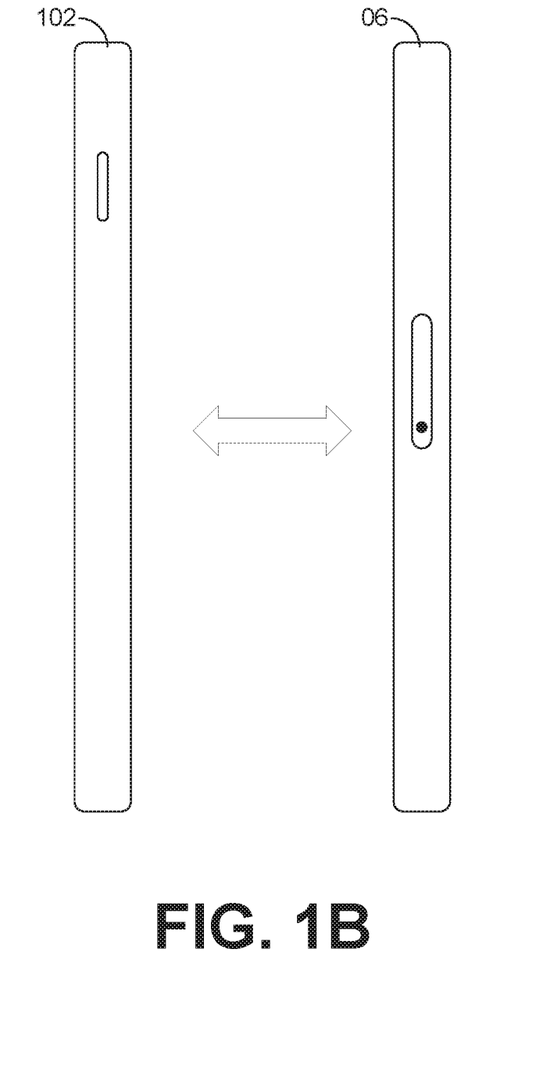
FIG. 1B is a drawing illustrating an administrator device and a client device engaging in an NFC session that facilitates provisioning of the client device according to examples of the disclosure.

Accordingly, examples of the disclosure can allow an IT administrator to quickly provision client devices by way of NFC. Referring to FIG. 1A, shown is an example of an administrator device 102, which can be used to provision client devices. As shown in FIG. 1B, the administrator device 102 and a client device 106 can communicate by NFC during an NFC session that is initiated by either the client device 106 or the administrator device 102. The administrator device 102 can execute a provisioning application 104 that is asked with transmitting configuration parameters or configuration data to a client device 106 that is being provisioned. The configuration parameters can be sent to the client device 106 by NFC during an NFC session. In this scenario, the client device 106 can represent an unprovisioned device, or a device that is in a factory reset condition. In other words, the client device 106 can be in a state where no device owner or administrator has been identified or associated with the operating system, no user credentials or user parameters have been entered, and no network accessibility has been configured.

As shown in the depicted example of a provisioning application 104, the provisioning process can take place through two successive NFC sessions, or NFC "bumps," between the administrator device 102 and the client device 106. The first NFC bump can communicate with the operating system of the client device 106 and provide network configuration parameters that are used by the operating system to configure network accessibility on behalf of the client device 106. For example, the network configuration parameters can include information on a wireless local area network to which the client device 106 can connect. The first NFC bump can also provide an identity of the management component, which is an application that can be installed on the client device 106 and provide enterprise management capabilities on the client device 106. The first NFC bump can provide the download location of the management component as well as an indication to the operating system that the management component is the device owner or device administrator. In other words, the first NFC bump can instruct the management component to download the management component from its download location, install the management component, and instruct the client device 106 that the management component has administrative or management privileges over the client device 106.

Upon installation of the management component on the client device 106, a second NFC bump between the administrator device 102 and client device 106 can be performed. During the second NFC bump, the administrator device 102 can transmit enrollment configuration parameters to the management component, which can then complete enrollment of the client device with a management service using the enrollment configuration parameters. In some examples, upon enrollment of the client device 106 with the management service, the management component can then initiate download and installation of other applications or configuration profiles onto the client device 106. In this way, the client device 106 can be provisioned by an IT administrator by performing two NFC bumps between the client device 106 and the administrator device 102.

Figure 2:
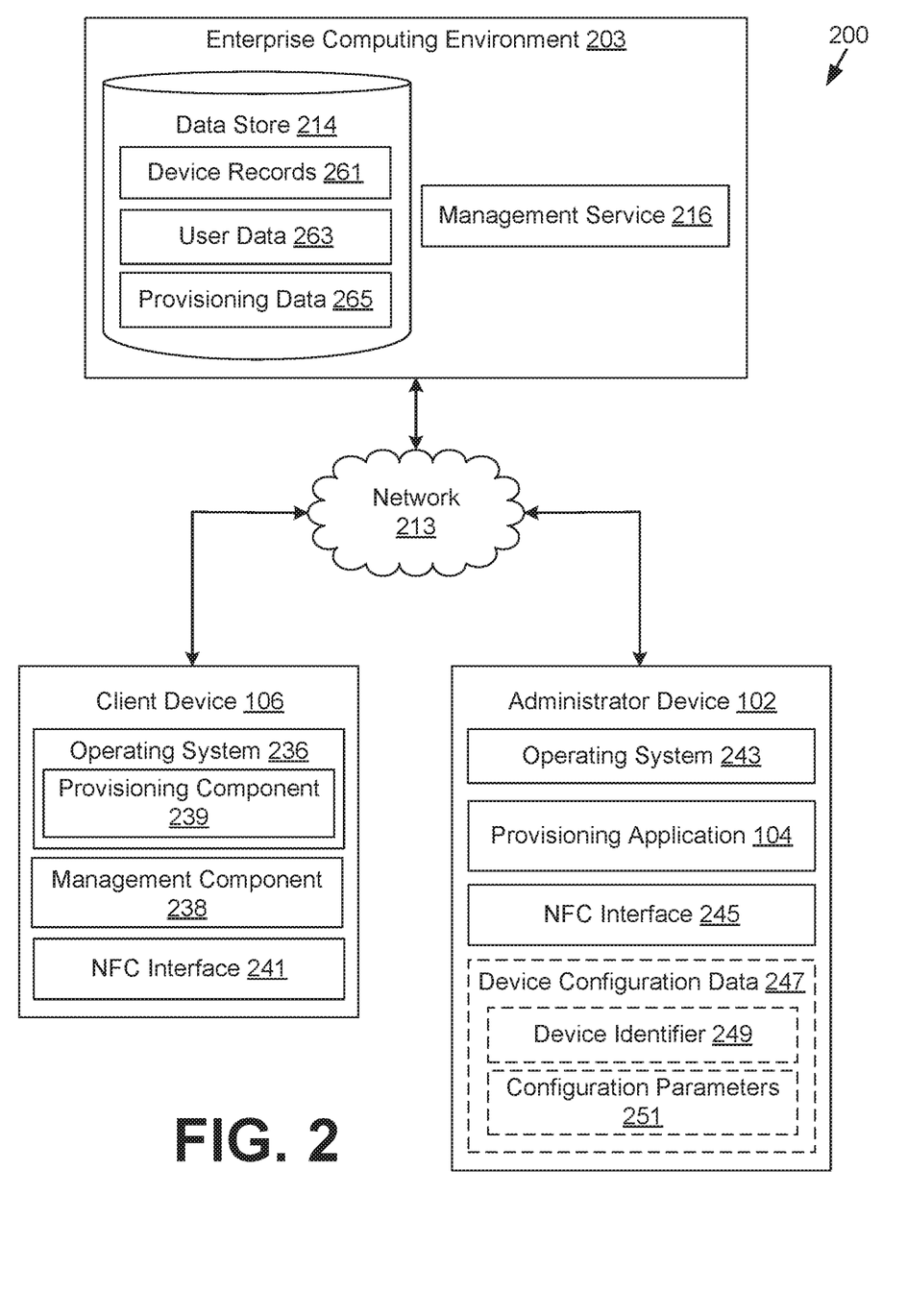
FIG. 2 is a drawing illustrating a network environment according to various examples of the disclosure.

FIG. 2 illustrates an example of a networked environment 200 according to examples of the disclosure. In the depicted network environment 200, an enterprise computing environment 203 is in communication with at least one administrator device 102, and at least one client device 106 over a network 213.

The network 213 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 203 can be a computing environment that is operated by an enterprise, such as a business or other organization. The enterprise computing environment 203 includes a computing device, such as a server computer, that provides computing capabilities. Alternatively, the enterprise computing environment 203 can employ multiple computing devices that are arranged in one or more server banks or computer banks. In one example, the computing devices can be located in a single installation. In another example, the computing devices for the enterprise computing environment 203 can be distributed among multiple different geographical locations. In one case, the enterprise computing environment 203 includes multiple computing devices that together can form a hosted computing resource or a grid computing resource. Additionally, the enterprise computing environment 203 can operate as an elastic computing resource where the allotted capacity of computing-related resources, such as processing resources, network resources, and storage resources, can vary over time. In other examples, the enterprise computing environment 203 can include or be operated as one or more virtualized computer instances that can be executed to perform the functionality that is described herein.

Various applications or other functionality can be executed in the enterprise computing environment 203. Also, various data can be stored in a data store 214 that can be accessible to the enterprise computing environment 203. The data store 214 can be representative of a plurality of data stores 214. The data stored in the data store 214 can be associated with the operation of the various applications or functional entities described below.

The components executed on the enterprise computing environment 203 can include a management service 216 and other applications, services, processes, systems, engines, or functionality not discussed in detail herein. The management service 216 can be executed in the enterprise computing environment 203 to monitor and oversee the operation of one or more client devices 106 by administrators. In some examples, the management service 216 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 216.

The management service 216 can include a management console that generates user interfaces that can allow administrators to interact with the management service 216 to manage client devices 106 that are enrolled with the management service 216. The user interfaces can allow an administrator to define policies for a user account or devices associated with an enterprise environment. The user interfaces can also include, for example, presentations of statistics or other information regarding the client devices 106 that can be managed by the management service 216.

Client devices 106 can be enrolled with the management service 216 as managed devices. As noted above, operating system APIs provided by a client device 106 can allow the client device 106 to be remotely managed by the management service 216. In this sense, the management service 216 is executed remotely from the client device 106. The APIs can allow the management service 216 to manage a client device 106 by providing the ability to push profiles, policies, and applications to the client device 106.

The client device 106 can represent multiple client devices 106 coupled to the network 213. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 216 as a managed device of the enterprise.

The client device 106 can execute an operating system 236 that includes a provisioning component 239. The client device 206 can also execute a management component 238 when provisioned. The management component 238 can communicate with the management service 216 to enforce management policies and compliance rules on the client device 106. For example, the management component 238 can enforce data security requirements, install, remove or update security certificates, or write, modify or delete certain data from the client device 106. The management component 238 can also monitor network activity of the client device 106, the location of the client device 106, enforce password or personal identification number (PIN) requirements, or any other security or acceptable-use policies that are defined in the management service 216 and sent to the management component 238 over the network 213.

To carry out local management of a client device 106, the management component 238 can be installed and executed with elevated or administrative privileges on the client device 106. In some scenarios, the operating system 236 can allow a particular application or package to be identified as a device owner or a device administrator when the device is initially provisioned from a factory-reset condition. Accordingly, the management component 238 can be identified as the device owner and installed on the client device 106 when the client device 106 is initially provisioned, as will be described herein.

The client device 106 can also be equipped with an NFC interface 241 that allows for communication with other devices via NFC. The NFC interface 241 can be associated with software libraries or APIs that might be integrated within the operating system 236 that allow applications to interface with a hardware NFC capability. The NFC interface 241 can allow for NFC sessions to be established with nearby devices. In other words, the NFC interface 241 can provide the capability for NFC bumps to be performed, which initiate an NFC session in which data can be exchanged between devices. In the context of this disclosure, a client device 106 can be provisioned by performing one or more NFC bumps and exchanging data through the NFC interface 241.

The provisioning component 239 of the operating system 236 includes logic that allows a client device 106 that is in a factory reset condition to be configured with network configuration parameters, an indication of a device administrator or device owner, and a command to download and install a package that is associated with the device administrator or device owner. The provisioning component 239 can allow the client device 106 to be configured following an NFC bump. However, the provisioning component 239 that is bundled with the operating system 236, such as the Android™ operating system, might not provide the capability to further configure the enrollment of the client device 106 with the management service 216 because the enrollment of the client device 106 is performed through the management component 238. In some examples, the provisioning component 239 can be a portion of the operating system 236 or a module within the operating system 236.

Accordingly, once enrolled as a managed device through the management component 238, the management component 238 interacts with the management service 216 to monitor and manage data, software components, and hardware components on the client device 106. The management component 238 can also install profiles containing device configuration information, such as virtual private network (VPN) configuration information, network authentication information, wireless network configuration, identity or security certificates that are installed on the device, or other configuration profiles. The management component 238 can install applications on the client device 106 on behalf of the management service 216, establish enterprise or personal workspaces on the client device 106, or perform any other management or security operations that are allowed through the management APIs provided by the operating system 236.

The administrator device 102 can represent one or more devices that are coupled to the network 213. The administrator device 102 includes, for example, a processor-based computer system. According to various examples, an administrator device 102 can be in the form of a desktop computer, a laptop computer, a personal digital assistant, a mobile phone, a smartphone, or a tablet computer system. The administrator device 102 can represent a device that is used by an IT administrator or IT user that is tasked with provisioning one or more client devices 106 of the enterprise that are owned or issued by the enterprise to various users. The administrator device 102 can be a device that has similar capabilities as a client device 106, such as a smartphone.

The administrator device 102, like the client device 106, executes an operating system 243. The operating system 243 can be the same as or different from the operating system 236 of the client device 106. The administrator device 102 can also execute a provisioning application 104. The provisioning application 104 can communicate with a client device 106 during one or more NFC sessions, or during NFC bumps, to provision the client device 106. The provisioning application 104 can transmit configuration parameters to a client device 106 that begins in a factory-reset condition to configure the network access of the client device 106, identify the device owner of the client device 106, send a command to download and install the management component 238, and configure the enrollment of the client device 106 with the management service 216.

The administrator device 102, like the client device 106, is also configured with an NFC interface 245. As described herein, the provisioning application 104 can communicate with the client device 106 to provision the client device 106 through the NFC interface 245.

In some examples, the administrator device 102 can store device configuration data 247. The device configuration data 247 represents configuration parameters that can be used by the provisioning application 104 to provision or configure client devices 106. In one example, an IT administrator can store device configuration data 247 on a data store 214 that is associated with the management service 216. The provisioning application 104 can retrieve the device configuration data 247 from the management service 216 or another download location over the network 213.

The device configuration data 247 can represent a mapping of device identifiers 249 to various configuration parameters 251. Each record in the device configuration data 247 can be associated with a device identifier 249 that uniquely identifies a client device 106 with respect to other client devices 106. The device identifier 249 can represent a media access control (MAC) address, an international mobile station equipment identity (IMEI), or any other identifier of the device. Each record can also be linked with a set of configuration parameters 251. The configuration parameters 251 can be used by the provisioning application 104 to provision or configure a particular client device 106. For example, configuration parameters 251 can include network configuration parameters, such as a wireless network service set identifier (SSID), a wireless network security setting, a network security key or security certificate, or any other network access properties with which a client device 106 can connect and access the network 213. The configuration parameters 251 can include management component data, such as a download location of the management component 238. The download location of the management component 238 might include a network-accessible application repository, an internet protocol (IP) address of a repository, or any other information with which the provisioning component 239 of the operating system 236 can locate and download the management component 238.

The configuration parameters 251 can also include enrollment configuration parameters, such as a username, password, or other credential with which a client device 106 should be configured. Enrollment configuration parameters can also identify a network address of the management service 216 to which the management component 238 can be pointed, an organizational unit or organizational group within a directory service with which the management component 238 can be configured, or any other enrollment parameter with which the management component 238 can be configured to complete enrollment of the client device 106 as a managed device with the management service 216.

In some examples, the device configuration data 247 might not include separate records for each individual device or device identifier 249. In this scenario, the device configuration data 247 can be retrieved from a network-accessible download location or entered into the provisioning application 104 through a user interface. The parameters entered into the provisioning application 104 can then be used to configure any client device 106 with which NFC bumps are performed.

The data stored in the data store 214 can include one or more device records 261, user data 263, provisioning data 265, and potentially other data. A device record 261 can represent various security settings selected for enforcement on a client device 106 that is enrolled with the management service 216. Accordingly, a device record 261 can include a device identifier associated with a device, such as the client device 106, a compliance status, a user associated with a particular device, and potentially other data. The device record 261 can also store other device specific information, such as a device type, operating system type or version, applications that are required or optional for the device, or an enrollment status of the device. In this scenario, the device record 261 can also indicate whether a managed device is a computing device or a peripheral device, such as a printer, scanner, or other device that can be deployed in an environment and associated with a record in a directory service.

The device record 261 can also specify policies that can be enforced by the management service 216 or by the client device 106. For example, the device record 261 can identify other user specific or device specific policies that are associated with a particular client device 106, such as policies that are related to the location of the client device 106, network settings of the client device 106, applications that are installed on the client device 106, or any other properties associated with the configuration of the client device 106.

User data 263 contains information about users who are associated with client devices 106 that are enrolled with the management service 216. User data 263 can include profile information about a user, authentication information about a user, and other user information. For example, user data 263 can include information about client devices 106 that are associated with a user account of the user, enterprise resources to which a particular user has access, such as email, calendar data, documents, media, applications, network sites, or other resources. The user data 263 can also identify one or more user groups of which a particular user is a member, which can in turn define the access rights of the user to one or more enterprise resources as well as identify which applications should be deployed to a client device 106 associated with the user. To this end, the user data 263 can further identify one or more device identifiers that can uniquely identify client devices 106 that are associated with a user account of the user.

Provisioning data 265 can include information on how client devices 106 should be provisioned by the provisioning application 104. As noted above, in some examples, the provisioning application 104 can retrieve configuration parameters used to provision client devices 106 from the management service 216. Accordingly, an IT administrator can define profiles that specify the various parameters the provisioning application 104 can use to provision client devices 106 on a per-device device, or on a group-wise basis and make the parameters available for download by the provisioning application 104.

Next, examples of how the provisioning application 104 can provision client devices 106 through one or more NFC bumps will be described. As noted above, the administrator device 102 can store device configuration data 247, which can be used by the provisioning application 104 to provision client devices 106. In some examples, the provisioning application 104 can provision a client device 106 that is in a factory-reset condition by performing two NFC bumps, or by initiating two NFC sessions in which data can be transmitted to the client device 106.

An IT administrator can enter a mode within the provisioning application 104 that configures the application to transmit data for the first of two NFC bumps with a client device 106. An IT administrator would activate this mode to begin the provisioning process for a factory-reset client device 106. The operating system 236 of a factory-reset client device 106 allows the provisioning component 239 to obtain and configure certain aspects of the client device 106. In a factory-reset condition, the provisioning component 239 can configure network accessibility parameters, such as wireless network parameters that the operating system 236 can use to access the network 213. The provisioning component 239 can also set the device owner or device administrator of the client device 106. The provisioning component 239 can also download and install an application that is associated with the device owner or device administrator. In one scenario, the device owner or device administrator can be set as the management component 238, and the provisioning component 239 can download and install the management component 238 onto the client device 106.

Accordingly, when the provisioning application 104 is set by the IT administrator to perform a first NFC bump with the client device 106, the provisioning application 104 transmits the network configuration parameters, an indication that the management component 238 is the device owner, and a command to download and install the management component 238 onto the client device 106. The provisioning application 104 can format the data transmitted in the first NFC bump in a format specified by the maker of the operating system 236 such that the provisioning component 239 can recognize and intercept the data sent to the client device 106. Upon receiving the data in the first NFC bump, the provisioning component can configure the network parameters of the operating system 236, set the device owner as the management component 238, and then download and install the management component 238.

Accordingly, an IT administrator can start the provisioning process for a large number of client devices 106 by activating a mode in the provisioning application 104 to perform a first NFC bump with the client device 106. Next, the IT administrator can simply perform an NFC bump with any number of client devices 106 that are in a factory-reset condition. Assuming network connectivity through the wireless network with which the client devices 106 are configured, performing the first NFC bump will result in the client devices 106 being provisioned with the management component 238. Additionally, the management component 238 can be configured with the capability to intercept data received by the client device 106 through the NFC interface 241.

However, the management component 238 also requires configuration that can be specific to the user or at least to the enterprise associated with the user. Accordingly, a second NFC bump can be performed to configure the various user or organization-specific parameters of the management component 238. Therefore, an IT administrator can enter a different mode of the provisioning application 104 in which the provisioning application 104 is configured to perform a second NFC bump with client devices 106. The second NFC bump can be formatted in a way that is recognized by the management component 238. The second NFC bump contains enrollment parameters that can be used by the management component 238 to complete enrollment of the client device 106 with the management service 216.

Figure 3:
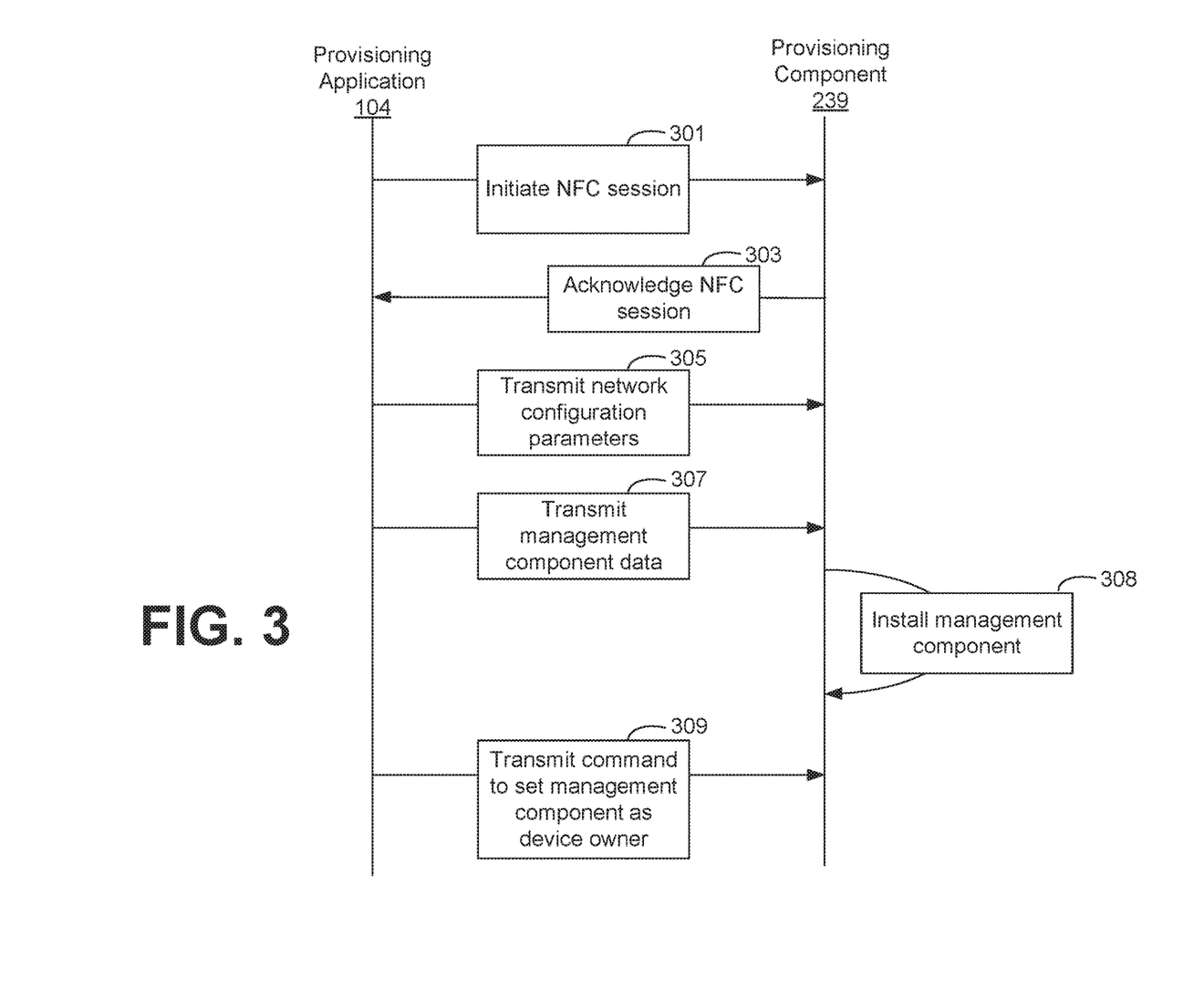
FIG. 3 is a sequence diagram illustrating a first NFC session according to various examples of the disclosure.

Referring next to FIG. 3, shown is a sequence diagram that provides one example of interactions between components shown in the example networked environment 200 of FIG. 2. FIG. 3 illustrates an example of how the provisioning application 104 can perform a first NFC bump with a client device 106 to begin the provisioning process. As noted above, a client device 106 in a factory-reset condition can be initially configured through a NFC bump that communicates with the provisioning component 239 of the operating system 236. Accordingly, at step 301, the provisioning application 104 can initiate a NFC session with the client device 106.

At step 303, the provisioning component 239 of the operating system 236 can acknowledge the NFC session.

At step 305, the provisioning application 104 can transmit network configuration parameters to the provisioning component 239. The network configuration parameters specify how the client device 106 can connect to the network 213. For example, the network configuration parameters can include an SSID, security key or password, proxy configurations, or other settings for a wireless network that provides Internet connectivity.

At step 307, the provisioning application 104 can transmit data regarding the management component 238 to the provisioning component 239. For example, the provisioning application 104 can provide a download location of the management component 238 so that the provisioning component 239 can download and install the management component 238 on the client device 106.

At step 308, the provisioning component 239 can install the management component 238 on the client device 106. In some examples, the provisioning application 104 can also provide a checksum or other data with which the provisioning component 239 can verify the management component 238 before its installation.

As step 309, the provisioning application 104 can transmit a command to set the management component 238 as the device owner or device administrator of the client device 106. Accordingly, upon completion of the first NFC bump, the provisioning application 104 has performed initial configuration of the client device 106, but enrollment of the client device 106 with the management service 216, which requires additional configuration of the management component 238, is not complete.

Figure 4:
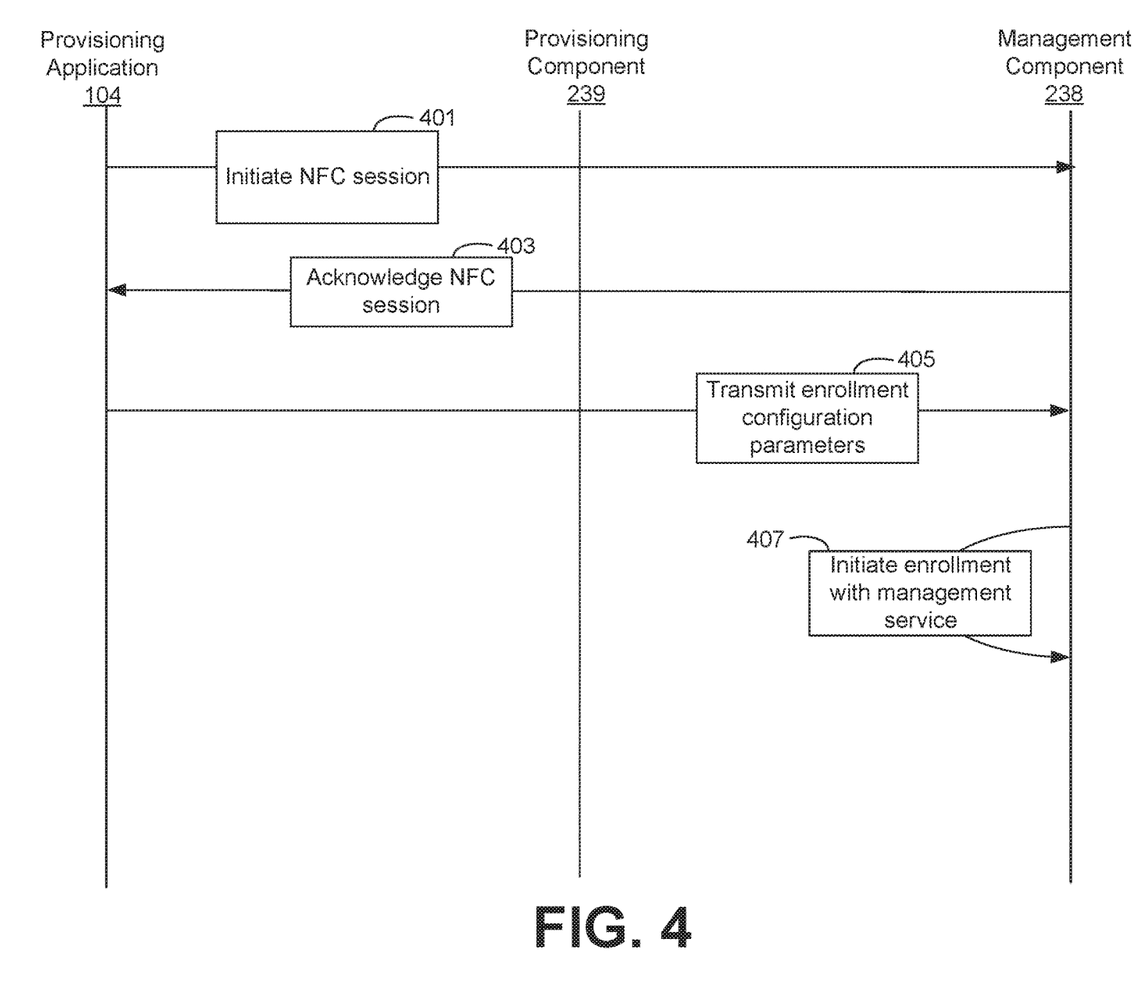
FIG. 4 is a sequence diagram illustrating a second NFC session according to various examples of the disclosure.

Referring next to FIG. 4, shown is a sequence diagram that provides one example of interactions between components shown in the example networked environment 200 of FIG. 1. FIG. 4 illustrates an example of how the provisioning application 104 can perform a second NFC bump with the client device 106 to complete configuration of the client device 106. In one example, an IT administrator can enter a mode within the provisioning application 104 that instructs the provisioning application 104 to perform a second NFC bump with client devices 106.

At step 401, the provisioning application 104 can initiate a NFC session with the client device 106. The NFC session can communicate with the management component 238, which can be configured to examine data received in NFC bumps and determine whether the NFC bump is intended for the management component 238 or another application on the client device 106.

At step 403, the management component 238 can acknowledge the NFC session to the provisioning application 104 and await data transmissions from the provisioning application 104.

At step 405, the provisioning application 104 can send enrollment configuration parameters to the management component 238. As noted above, the enrollment configuration parameters can include a username, password, network location of the management service 216, organizational group or organizational unit associated with the client device 106, and any other parameters necessary to complete enrollment of the client device 106 with the management service 216.

In some examples, a staging username and password can be used to complete the enrollment of the client device 106 with the management service 216. A staging username and password can be associated with a placeholder or temporary identity within the management service 216. Upon enrollment of the client device 106 with the management service 216, the management component 238 can prompt the user to enter his or her credentials so that the user's identity within the management service 216 or a user directory can be associated with the client device 106. In other examples, the device configuration data 247 can associate a specific username and password for the particular client device 106 with which the provisioning application 104 is communicating in the NFC session.

At step 407, the management component 238 can initiate enrollment of the client device 106 with the management service 216. In some scenarios, the management component 238 can also initiate installation of other applications, policies, or profiles that are designated by the management service 216 as required for enrolled devices in the organizational unit or organizational group into which the client device 106 is enrolled.

In this way, the provisioning application 104 can facilitate bulk configuration and enrollment of client devices 106 that are in a factory-reset condition by performing two NFC bumps with the administrator device 102. This can provide valuable efficiency and time savings to an IT administrator tasked with configuring and enrolling a large number of client devices 106 with the management service 216.

Figure 5:
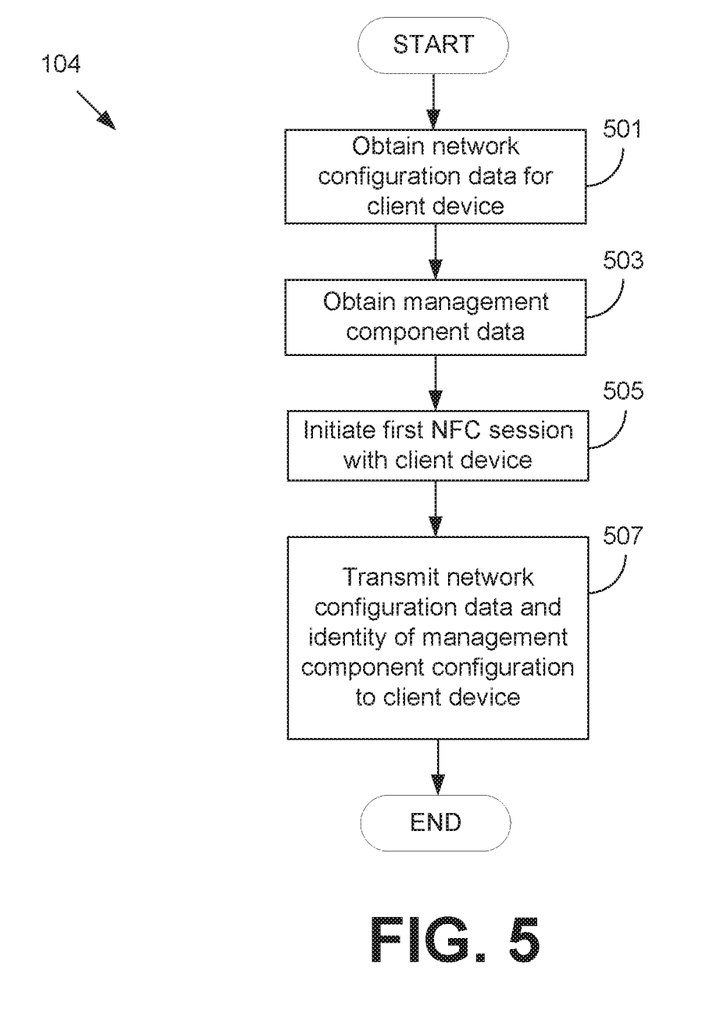
FIG. 5 is a flowchart illustrating one example of functionality implemented in an administrator device according to various examples of the disclosure.

Referring next to FIG. 5, shown is a flowchart that provides one example of how the provisioning application 104 can perform a first NFC bump that performs initial configuration of the client device 106. As an alternative, the flowchart of FIG. 5 can be viewed as depicting an example of elements of a method implemented in the administrator device 102.

At step 501, the provisioning application 104 can obtain network configuration parameters with which client devices 106 can access the network 213. As noted above, the network configuration parameters can include a SSID, password, key, security certificate, or other wireless network access parameters.

At step 503, the provisioning application 104 can obtain data regarding the management component 238. The data regarding the management component 238 can include a package name, download location and checksum of the management component 238. Additionally, the data regarding the management component 238 can be a command to download and install the management component 238. The data regarding the management component 238 can further include a command to set the management component 238 as the device owner or device administrator of the client device 106.

At step 505, the provisioning application 104 can initiate a NFC session, or a first NFC bump, with the client device 106. The first NFC bump can be captured by or routed to the provisioning component 239, as the client device 106 is in a factory-reset condition.

At step 507, the provisioning application 104 can transmit the network configuration parameters and management component data to the provisioning component 239 of the operating system 236. In response, the provisioning component 239 can connect to the network 213 using the network configuration parameters, download the management component 238, install the management component 238, and set the management component 238 as the device owner or device administrator. Thereafter, the process proceeds to completion.

Figure 6:
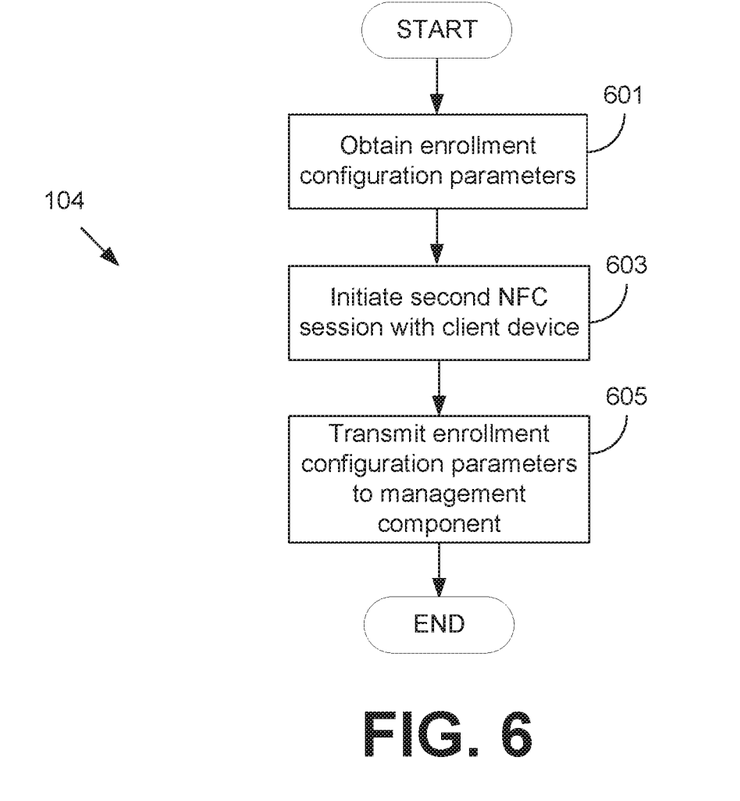
FIG. 6 is a flowchart illustrating another example of functionality implemented in an administrator device according to various examples of the disclosure.

Referring next to FIG. 6, shown is a flowchart that provides one example of how the provisioning application 104 can perform a second NFC bump that provides enrollment configuration data to the client device 106 to complete enrollment of the client device 106 with the management service 216. As an alternative, the flowchart of FIG. 5 can be viewed as depicting an example of elements of a method implemented in the administrator device 102.

At step 601, the provisioning application 104 can obtain enrollment configuration parameters with which the management component 238 can complete enrollment of the client device 106. The enrollment configuration parameters can be obtained from device configuration data 247. In some examples, the enrollment configuration parameters can be device-specific and can vary from device to device. For example, a particular device with a particular device identifier 249 can be associated with associated with a username and password that the management component 238 can use to complete enrollment of the client device 106 with the management service 216. In another example, the provisioning application 104 can be configured with a staging username and password that can be used on more than one client device 106 to complete enrollment. When the client device 106 is presented to a user, the management component 238 can prompt the user to enter his or her username and password.

The enrollment configuration parameters can also include a network address of the management service 216 as well as an organizational unit or organizational group parameter, which the management component 238 can use to complete enrollment of the client device 106.

Next, at step 603, the provisioning application 104 can initiate a NFC session, or a second NFC bump, with the client device 106. The second NFC bump can be captured by or routed to the management component 238 because the second NFC bump is initiated for the purpose of transmitting enrollment configuration data to the management component 238. In one example, an IT administrator using the provisioning application 104 can enter a different mode of the application to initiate the second NFC bump rather than the first NFC bump.

At step 605, the provisioning application 104 can transmit the enrollment configuration parameters to the client device 106 via NFC in the second NFC bump. In response to receiving the enrollment configuration parameters, the management component 238 can complete enrollment of the client device 106 with the management service 216. Thereafter, the process proceeds to completion.

Although this disclosure has used the example of two NFC bumps to complete the enrollment process, the entire process can occur in a single bump, or in more than two bumps. The examples of information exchanged between an administrator device and a client device can vary from the examples described, and need not be transmitted in the first bump and second bump. Instead, some of the information can be sent in a first bump, more information in a second bump, and additional information in a third or additional bumps. In addition, the exact information to be exchanged is exemplary, as more or less information can also be used to enroll a device with an enterprise mobility management suite using NFC bumping.

The sequence diagrams of FIGS. 3-4 and the flowcharts of FIGS. 5-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although sequence diagram of FIGS. 3-4 and the flowcharts of FIGS. 5-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The enterprise computing environment 203, the administrator device 102, the client device 106, and other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data or components that are executable by the one or processors of the processing circuit. The provisioning application 104, management service 216 or other components can be stored in one or more storage devices and be executable by one or more processors. Also, a data store, such as the data store 214, can be stored in the one or more storage devices.

The management service 216, the management component 238, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executed by an administrator device configured to facilitate provisioning of a client device, wherein the program is configured to cause the administrator device to at least:
   initiate a near field communication (NFC) session with the client device, wherein the client device is in a factory reset condition;
   transmit network configuration parameters to the client device in the NFC session;
   transmit a download location of a management component to the client device in the NFC session, wherein the management component is downloaded from the download location and installed by the client device; and
   transmit at least one enrollment configuration parameter to the client device in the NFC session, wherein the at least one enrollment configuration parameter comprises an identifier associated with an organizational group associated with the client device and a network address associated with a management service, wherein the client device is enrolled with the management service by the management component.

2. The non-transitory computer-readable medium of claim 1, wherein the at least one enrollment configuration parameter further comprises at least one of a username or a password.

3. The non-transitory computer-readable medium of claim 1, wherein the network configuration parameters comprise a service set identifier (SSID) for a wireless network, a security type associated with the wireless network, and a security key associated with the wireless network.

4. The non-transitory computer-readable medium of claim 1, wherein the program is further configured to cause the administrator device to at least generate a user interface that facilitates entry of the network configuration parameters.

5. The non-transitory computer-readable medium of claim 4, wherein the user interface facilitates entry of an indication of the management component.

6. The non-transitory computer-readable medium of claim 1, wherein the program is further configured to cause the administrator device to at least obtain an acknowledgement of initiation of the NFC session from the client device.

7. The non-transitory computer-readable medium of claim 1, wherein transmission of the download location causes an operating system of the client device to download and install the management component onto the client device.

8. A method for provisioning a client device by an administrator device, comprising:
   initiating a near field communication (NFC) session with the client device, wherein the client device is in a factory reset condition;
   transmitting network configuration parameters to the client device in the NFC session;
   transmitting a download location of a management component to the client device in the NFC session, wherein the management component is downloaded from the download location and installed by the client device; and
   transmitting at least one enrollment configuration parameter to the client device in the NFC session, wherein the at least one enrollment configuration parameter comprises an identifier associated with an organizational group associated with the client device and a network address associated with a management service, wherein the client device is enrolled with the management service by the management component.

9. The method of claim 8, wherein the at least one enrollment configuration parameter further comprises at least one of a username or a password.

10. The method of claim 8, wherein the network configuration parameters comprise a service set identifier (SSID) for a wireless network, a security type associated with the wireless network, and a security key associated with the wireless network.

11. The method of claim 8, further comprising generating a user interface that facilitates entry of the network configuration parameters.

12. The method of claim 11, wherein the user interface facilitates entry of an indication of the management component.

13. The method of claim 8, further comprising obtaining an acknowledgement of initiation of the NFC session from the client device.

14. The method of claim 8, wherein transmission of the download location causes an operating system of the client device to download and install the management component onto the client device.

15. A system comprising:
   an administrator device; and a provisioning application executable by the administrator device, wherein the provisioning application causes the at least one computing device to at least:
  initiate a near field communication (NFC) session with a client device, wherein the client device is in a factory reset condition;
  transmit network configuration parameters to the client device in the NFC session;
  transmit a download location of a management component to the client device in the NFC session, wherein the management component is downloaded from the download location and installed by the client device; and
  transmit at least one enrollment configuration parameter to the client device in the NFC session, wherein the at least one enrollment configuration parameter comprises an identifier associated with an organizational group associated with the client device and a network address associated with a management service, wherein the client device is enrolled with the management service by the management component.

16. The system of claim 15, wherein the at least one enrollment configuration parameter further comprises at least one of a username or a password.

17. The system of claim 15, wherein the network configuration parameters comprise a service set identifier (SSID) for a wireless network, a security type associated with the wireless network, and a security key associated with the wireless network.

18. The system of claim 15, wherein the provisioning application is further configured to cause the administrator device to at least generate a user interface that facilitates entry of the network configuration parameters.

19. The system of claim 18, wherein the user interface facilitates entry of an indication of the management component.

20. The system of claim 15, wherein transmission of the download location causes an operating system of the client device to download and install the management component onto the client device.

* * * * *